H. O. KING.
BEARING SPACER FOR AUTOMOBILE TRUCK AXLES.
APPLICATION FILED MAY 31, 1917.
1,265,090.
Patented May 7, 1918.
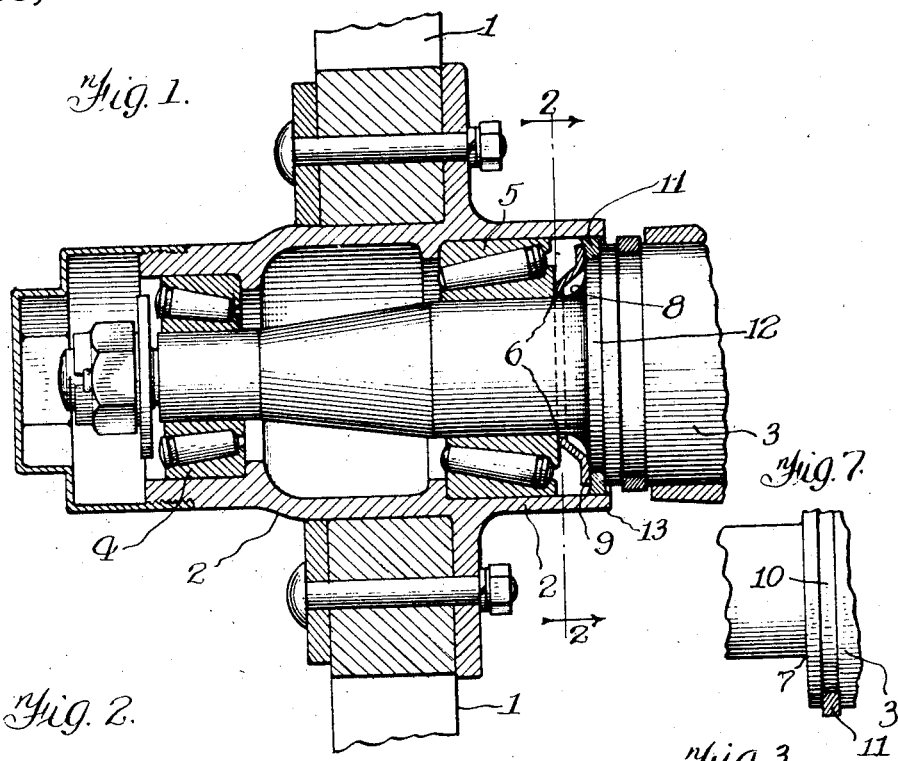
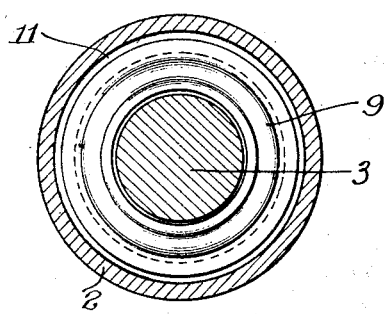
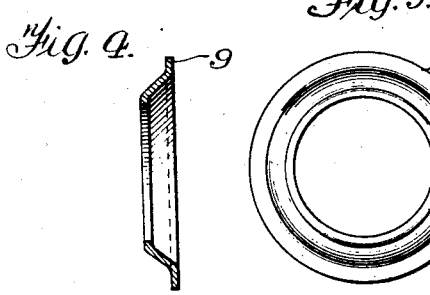
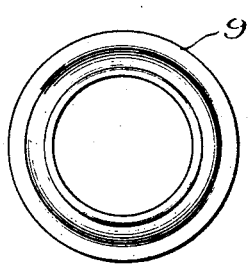
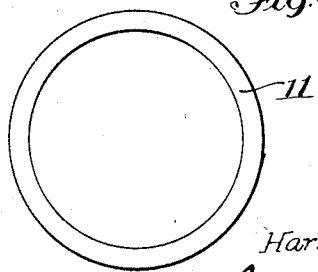
Witnesses
A. J. Sauser.
H. J. Wood
Inventor:
Harry O. King,
By W. E. Williams Atty.

UNITED STATES PATENT OFFICE.

HARRY ORLAND KING, OF CHICAGO, ILLINOIS, ASSIGNOR TO PHENIX TRUCK MAKERS INC., OF CHICAGO, ILLINOIS, A CORPORATION.

BEARING-SPACER FOR AUTOMOBILE-TRUCK AXLES.

1,265,090.

Specification of Letters Patent. Patented May 7, 1918.

Application filed May 31, 1917. Serial No. 171,822.

*To all whom it may concern:*

Be it known that I, HARRY O. KING, a citizen of the United States, and a resident of Chicago, in the county of Cook and State of Illinois, have invented a new and useful Improvement in Bearing-Spacers for Automobile-Truck Axles, of which the following is a specification.

My invention relates to some details of construction that have for their object improvement in the form of the axle adjacent to the inner bearing and improvement in the means of holding in place the dust guard packing of the axle box.

Reference will be had to the accompanying drawings in which:

Figure 1 is a sectional elevation through the axle hub of an automobile wheel with my improvements.

Fig. 2 is a transverse section on line 2—2 of Fig. 1.

Fig. 3 is a plan view of my bearing spacer.

Fig. 4 is a sectional edge view of Fig. 3.

Fig. 5 is a plan of a felt packing ring.

Fig. 6 is an edge sectional view of Fig. 5.

Fig. 7 is a view of the old style axle.

In the drawings 1 indicates the spokes of an ordinary automobile truck wheel or pleasure car wheel. 2 indicates the hub of the wheel and 3 the axle. 4 and 5 indicate the roller bearings generally used on these axles.

The bearing makers, both roller and ball styles, make their bearings with sharp corners at the inner corners 6 of the inner raceways. These corners are not actually sharp but are rounded off only slightly perhaps not more than on a thirty second of an inch radius.

In order to properly seat the raceway of the bearing in the throat of the axle at the rear of the hub it has been the practice to turn out this shoulder to fit the corner 6 of the inner raceway amounting to practically a sharp corner as indicated by 7 in Fig. 7.

It is a well known fact that any metal, and especially steel, is most liable to crack in places where there are sharp corners or abrupt shoulders, and automobile axles seem to have a habit of breaking in the throat at the point 7.

The best service in so far as the strength of the axle is concerned is obtained when there is a gentle fillet in the place of the sharp corner 7, and this fillet is indicated by 8 in Fig. 1.

The fillet 8 does not furnish a suitable shoulder to take the end thrust of the anti-friction bearings of the forms that are now standard and when I use this fillet 8, I provide the bearing spacer 9 in the form of a pressed metal ring which furnishes the shoulder adapted to take the end thrust of the bearing.

In order to close in the interior of the hub to keep out dirt and grit and retain the lubrication within the hub bearings as desired, it has been customary to form a groove 10 in the base of the axle as shown by Fig. 7, and then force over into this groove 10 a felt washer or ring 11. When this is done with an axle groove in the form of Fig. 7 the felt washer is strained and ruptured and the fibers displaced to such an extent that they do not come back to normal after they are in the groove and seem to have a habit of rolling up in small pellets and thus wearing away to such an extent that the packing is of little service for the purpose intended.

In my case I make my bearing spacer 9 serve as one of the walls of the groove wherein is located the felt washer as is shown in Fig. 1. I form in the axle shoulder a seat 12 adapted to receive the felt washer as it may be threaded over the axle before the bearings and spacer are in place without stretching or expanding the felt washer in getting it to its seat 12.

I make the washer 11 greater in depth than the width of the seat 12 and when the spacer 9 is pressed home it compresses and clamps the washer 11 and thereby holds it firmly in place and at the same time causes it to expand slightly and make a neat fit on the inside of the hub end 13. This holds the fibers of the washer together and results in prolonging the life of the washer and at the same time causes it always to maintain a closer fit or seal as a dust guard and lubricator retainer than was the case with the old style forms.

Thus my bearing spacer 9 secures a much stronger axle form and obtains a much better dust guard seal than has heretofore been secured.

What I claim is:

1. An automobile axle construction wherein there is a curved shoulder or fillet in the throat of the axle in the region of the shoulder on the inner race ring of an anti-friction bearing, the combination of a bearing ring, a bearing spacer covering the fillet of the axle and furnishing a shoulder for the bearing and said spacer also furnishing one side or wall of a groove wherein is located the packing washer for dust guard purposes.

2. In an automobile axle construction a seat for a packing washer located in the shoulder of the axle at the rear of the hub, said seat open to receive a washer as the same is threaded over the axle without expanding the washer, in combination with a bearing spacer adapted to furnish a shoulder for the bearing and form a clamping member for the packing washer as located in its seat, with a bearing located adjacent to the bearing spacer.

3. In an automobile axle and hub construction a curved fillet in the throat of the axle in the region of the shoulder of the race ring of an inner anti-friction bearing, a seat for a packing washer in a shoulder of the axle adjacent to said fillet and a packing washer located in said seat, in combination with a spacer ring adapted to furnish a shoulder for the end thrust of the anti-friction bearing and at the same time act as a clamp to hold the packing washer in place, and an anti-friction bearing located adjacent to the bearing spacer.

4. In a construction of the class described a bearing spacer composed of a dish shaped ring adapted to cover a fillet in the throat of the axle and furnish a shoulder or abutment adapted to take the end thrust of the anti-friction bearing.

Signed at Chicago, in the county of Cook and State of Illinois this 28 day of May, 1917.

HARRY ORLAND KING.

Witnesses:
 ALBERT SAUSER,
 H. I. WOODS.